Figure 2:
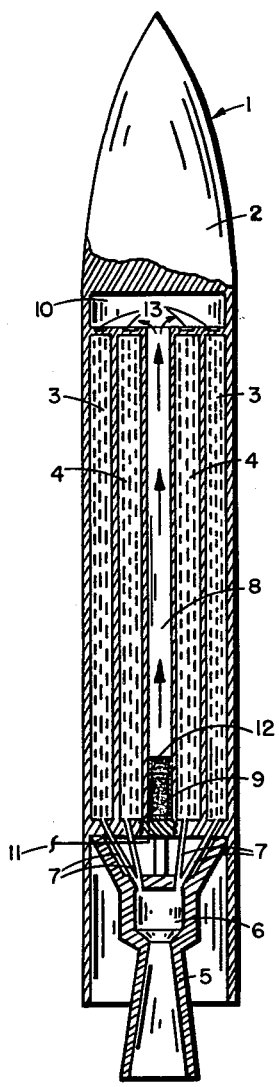

April 25, 1961  M. H. BOYER  2,981,616

GAS GENERATOR GRAIN

Filed Oct. 1, 1956

*INVENTOR.*
MYRON H. BOYER
BY
William N. Patrick
AGENT 2,981,616
Patented Apr. 25, 1961

2,981,616
GAS GENERATOR GRAIN

Myron H. Boyer, Puente, Calif., assignor to North American Aviation, Inc.

Filed Oct. 1, 1956, Ser. No. 613,327

8 Claims. (Cl. 52—.5)

This invention relates to a novel composition of matter suitable for generating gases. More particularly, this invention relates to a composition which upon ignition generates an inert gas useful for pressurizing rocket propellant tanks.

In a rocket or missile which is operated on liquid fuel, it is necessary to provide a means for supplying the fuel to the engine at a predetermined rate. This rate must be of a magnitude sufficient to sustain uninterrupted combustion from which power is derived to operate the rocket. The use of pumps is one method for supplying the fuel to the rocket engine. To obviate the use of weighty pumping equipment, a method of feeding the fuel to the combustion chamber by the development of gas pressure in the fuel tank has been employed. The gas developing the pressure may be obtained from the combustion product of a composition of matter called a gas generator grain. The gas generator grain is ignited at the time the motor is put into operation and as combustion consumes the grain, the resulting gaseous products exert a pressure inside the fuel compartment causing the fuel to flow through feed lines to the rocket motor. One gas generator grain employed in the past was composed of a mixture of ammonium perchlorate and a hydrocarbon and sulfur-containing polymer. Among the combustion products of the gas generatorg rain were, therefore, hydrogen, carbon monoxide and hydrocarbon gases. These are reducing gases and, consequently, cannot be used with certain types of propellants such as, for example, nitric acid, as they would destroy the oxidizing characteristic of the fuel prior to its introduction into the combustion chamber of the motor. Also, the gases may form explosive vapor mixtures with fuels and/or oxidizer. Other combustion products of the sulfur-containing polymers are oxides of sulfur. These are very corrosive and cause damage to the motor. This not only reduces the period of serviceability but also impairs the operation of the motor during flight. The result is that the missile or rocket is more difficult to control and increases the hazard of loss due to motor failure. A need, therefore, existed for the development of a gas generator grain which, upon combustion, would give off inert gases only so as to affect neither the properties of the rocket fuel nor the operability of the motor.

It is therefore an object of this invention to provide a composition of matter suitable for use as a gas generator grain. It is also an object of this invention to provide a composition of matter which, upon combustion, produces only inert gaseous products. Another object of this invention is to provide a method for pressurizing propellant or fuel chambers of rockets and missiles. Other objects will become apparent from the discussion that follows.

The above and other objects of this invention are accomplished by a composition of matter comprising (1) an azide having the general formula $M(N_3)_x$ wherein M is selected from the class consisting of a metal, a hydrazino radical and an ammonium radical; N is nitrogen; and $x$ represents the valency of M, and (2) at least one oxidizing compound selected from the class consisting of metal peroxides, inorganic perchlorates and metal nitrates; said azides and said oxidizing compounds being present in amounts expressed by the equation $n/m=y$, wherein $n$ represents the number of azide nitrogen atoms, $m$ represents the number of equivalents of oxidizing compounds, and $y$ has a numerical value of from about 2.3 to about 3.6.

An example of the gas generator grain of this invention is a composition comprising calcium azide and potassium perchlorate in amounts such that the equation $n/m$ has the value 3.

The azides, $M(N_3)_x$, that can be used in the preparation of the compositions of this invention can be any azide which has suitable stability to permit grinding and handling in the preparation of the composition, and also will burn at a satisfactory rate without exploding. A class of metal azides which satisfy these requirements are the alkali and alkaline earth azides. Nonlimiting examples of these include lithium azide, sodium azide, potassium azide, rubidium azide, and cesium azide which constitute the alkali metal azides having the general formula $M(N_3)$. Since the valence, $x$, of M, the alkali metal is unity, the symbol $x$ is omitted from the formula. The alkaline earth azides include the calcium azide, strontium azide, and barium azide. The metal M in the formula $M(N_3)_x$ in this case is divalent and, therefore, the symbol $x$ has a numerical value of 2. The alkaline earth metals of which the azides are composed have atomic weights varying from 40 to 138 inclusive. When a hydrazine azide and ammonium azide are used, it is advisable to employ an explosion inhibitor such as diatomaceous earth in order to reduce the hazard of spontaneous decomposition.

The alkali metal azides are found to be particularly suited to the preparation of gas generator grains and compositions containing them constitute a preferred embodiment of this invention. The alkali metals of which the alkali metal azides are composed have atomic weights of from 6 to 133 inclusive.

The oxidizing compounds of which the composition of matter of this invention are prepared include metal peroxides, inorganic perchlorates and metal nitrates. The metal peroxides have the general formula $X_rO_s$ wherein X is a metal having an atomic weight of from 6 to about 138 inclusive, $r$ is the number of metal atoms in the peroxide compound and varies from 1 to 2. The value of $s$ varies from 1 to 2 and represents the number of oxygen atoms in the peroxide molecule. Nonlimiting examples of metal peroxides employed in the manufacture of the compositions of this invention include peroxides of group I-A metals such as sodium peroxide, $Na_2O_2$, potassium peroxide, $K_2O_2$, rubidium peroxide, $Rb_2O_2$, and cesium peroxide, $Cs_2O_2$; peroxides of group II-A metals such as calcium peroxide, $CaO_2$; strontium peroxide, $SrO_2$; barium peroxide, $BaO_2$. Examples of the inorganic perchlorates having the general formula $Y(ClO_4)_v$ wherein Y is selected from the class consisting of a metal and the ammonium radical, $v$ represents the valence of Y and has a numerical value of 1 to 3 inclusive, include ammonium perchlorate; group I-A metal perchlorates such as lithium perchlorate, $LiClO_4$, sodium perchlorate, $NaClO_4$, potassium perchlorate, $KClO_4$, and rubidium perchlorate, $RbClO_4$; group II-A metal perchlorates such as magnesium perchlorate, $Mg(ClO_4)_2$, calcium perchlorate, $Ca(ClO_4)_2$, strontium perchlorate, $Sr(ClO_4)_2$, and barium perchlorate, $Ba(ClO_4)_2$; group VIII perchlorates such as ferric perchlorate, $Fe(ClO_4)_3$, and cobalt perchlorate, $Co(ClO_4)_2$; and group III-A metal perchlorates such as $In(ClO_4)_3$. Non-limiting examples of metal nitrates having the general formula $T(NO_3)_z$ wherein T is a metal and $z$ is the valence of T having a numerical value of from 1 to 4 inclusive, include group I-A metal nitrates such as lithium nitrate, $LiNO_3$, sodium nitrate, $NaNO_3$, and potassium nitrate $KNO_3$; group I-B metal nitrates such as copper nitrate, $Cu(NO_3)_2$, and silver nitrate, $Ag(NO_3)$; group II-A metal nitrates such as magnesium nitrate, $Mg(NO_3)_2$, and barium nitrate, $Ba(NO_3)_2$; group II-B metal nitrates such as zinc nitrate; group III-A metal nitrates such as aluminum nitrate, $Al(NO_3)_3$, and thalium nitrate, $Tl(NO_3)$; group IV-A metal nitrates such as stannic nitrate, $Sn(NO_3)_4$; group V-A metal nitrate such as bismuth nitrate, $Bi(NO_3)_3$; group VII-B metal nitrates such as manganese nitrate, $Mn(NO_3)_3$; and group VIII metal nitrates such as ferric nitrate, ferrous nitrate and nickel nitrate. Methods for the preparation of metal peroxides, metal nitrates and inorganic perchlorates are given in volumes I and II of the text "Chemical Elements and Their Compounds" by N. V. Sidgwick, 1950 edition, published by the Clarendon Press.

The metal perchlorates and the metal peroxides are found to be particularly suited for preparing gas generator grains having good combustion characteristics. Therefore, compositions of this invention containing metal perchlorates and metal peroxides constitute a preferred embodiment of this invention. Compositions of this invention containing metal perchlorates as the oxidizing compounds are especially preferred because the perchlorates have very good stability against decomposition.

The ratio of the proportions of azides and oxidizing compounds in the composition of this invention are expressed by the equation $n/m=y$ wherein $n$ represents the number of azide nitrogen atoms and $m$ represents the number of equivalents of oxidizing compounds. The symbol "$y$" has a numerical value of from about 2.3 to about 3.6. The number of equivalents of oxidizing compound is obtained by multiplying the number of molecules of oxidizing compound by the change in valence that the oxidizing compound undergoes in its reaction with the metal azides. When the oxidizing compound used is a peroxide, the change in valence is 2. This is illustrated by the following equations:

$$Na_2O_2 + 2NaN_3 \rightarrow 2Na_2O + 3N_2 \quad (1)$$
$$BaO_2 + 2NaN_3 \rightarrow BaO + Na_2O + 3N_2 \quad (2)$$

In Equation 1 for example the valence of sodium in $Na_2O_2$ is two, while in the product $Na_2O$ its valence is unity. Hence, in the reaction in which $Na_2O_2$ is transformed into $Na_2O$, the change in valence per molecule is two. When the oxidizing molecule is a metal perchlorate, the change in valence per oxidizing molecule varies from 8 to 24 as determined by the number of chlorine atoms per molecule, the difference in the valence state of each chlorine atom before and after reaction with the azides is 8. This is illustrated by the following equations:

$$KClO_4 + 8NaN_3 \rightarrow KCl + 4Na_2O + 12N_2 \quad (3)$$
$$In(ClO_4)_3 + 12Ba(N_3)_2 \rightarrow InCl_3 + 12BaO + 36N_2 \quad (4)$$

When a metal nitrate is the oxidizing agent, the difference in valence before and after reaction with the metal azides is 3 for each nitrate nitrogen as illustrated by the equations $$2KNO_3 + 6NaN_3 \rightarrow 2NO + 3Na_2O + K_2O + 9N_2 \quad (5)$$
$$Sn(NO_3)_4 + 6Sr(N_3)_2 \rightarrow 4NO + 6SrO + SnO_2 + 18N_2 \quad (6)$$

In general, the compositions of this invention consist of gas generator grains comprising (1) an inorganic azide having the general formula $M(N_3)_x$ wherein M is selected from the class consisting of alkali metal, alkaline earth metal, the hydrazino radical and an ammonium radical; N is nitrogen; and $x$ represents the valence of M; and (2) at least 1 oxidizing compound selected from the class consisting of metal peroxides, inorganic perchlorates and metal nitrates; said azides and said oxidizing compounds being present in amounts expressed by the equation $n/m=y$ wherein $n$ represents the number of azide nitrogen atoms, $m$ represents the number of equivalents of oxidizing compounds, and $y$ has a numerical value of from about 2.3 to about 3.6.

In addition, the compositions of this invention may also contain minor amounts of metal and metalloid powders and their oxides as burning catalysts. Powdered or comminuted carbon, phosphorus and sulfur also serve as burning catalysts. The amounts can range from less than 0.1 weight percent to about 3 weight percent based on the weight of the combined azide and oxidizing compound. The particle size of the burning catalyst can vary from about 10 to 100 microns. Nonlimiting examples of metal and metalloid powders and their oxides that can be used as burning catalysts are copper, magnesium, boron, aluminum, zirconium, vanadium, antimony, manganese, iron, cobalt, nickel, ferric oxide, silica, etc.

In the preparation of the compositions of this invention the metal azide and the oxidizing compound are each comminuted separately to a particle size ranging from 10 to about 250 microns. The comminuting is performed in a suitable apparatus such as a ball mill. When working with amounts on a small scale, the comminuting may be performed by grinding with the aid of a mortar and pestle. Precautions should be taken when working with compounds such as hydrazine azide that the decomposition temperature is not reached. The finely divided metal azide and oxidizing compound are then blended to form a homogeneous composition. This composition is then made up in a suitable package for use in a missile or rocket fuel chamber for pressurization purposes.

Figure 1:
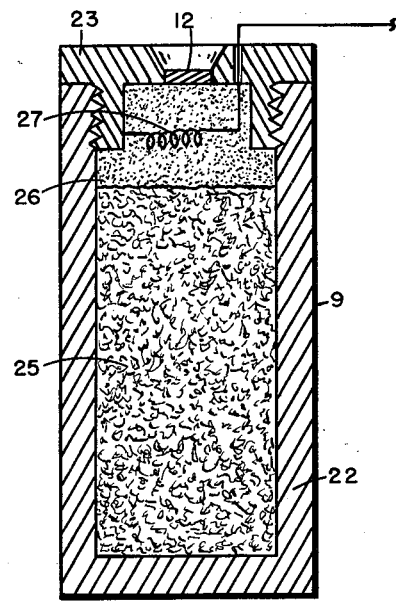

One type of gas generator grain unit is illustrated in Fig. 1. Unit 9 consists of a cylindrical metal container 22 packed with an azide-oxidizer composition 25. On top of the composition is placed a small amount of ignition compound 26. A closure cap 23, having a frangible disk 12 and an electrical heating element 27, is screwed into the upper end of the cylindrical metal container 22. By passing a current through the heating element 27, the ignition compound is ignited which, in turn, ignites the azide-oxidizer composition. The pressure generated inside the container breaks the frangible disk 12 which is constructed to rupture at a predetermined pressure. This unit may be placed in a suitable position inside the fuel container of a rocket aircraft so that upon ignition and combustion, the gases which are given off will pressurize the interior of the fuel container and thus act to force the fuel through feed lines to the rocket motor.

The compositions of this invention, as well as methods for their preparation, will be more fully explained in the following examples.

EXAMPLE I

Sodium azide and sodium peroxide were finely ground to a particle size of from 10 to about 250 microns with a mortar and pestle. To 1.55 parts of sodium azide was added 1 part of sodium peroxide and the two blended to form a homogeneous composition. This composition was then pressed into a stainless steel cylindrical container having one end closed with the aid of a hydraulic press. Dimensions of the container were ½ inch inside diameter by 4 inches long with a wall thickness of ¼ inch. A small amount of flash powder composed of a mixture of 10 parts barium peroxide and 1 part aluminum metal was placed on the surface of the pressed composition. A tightly fitting cover equipped with a heating element was placed on the container. The container cover was equipped with a frangible disk constructed to rupture at a predetermined pressure in order to permit combustion gases to escape. This constituted a gas generating unit in which the sodium azide-sodium peroxide was the gas generating grain. The amounts of sodium azide and sodium peroxide were such that the ratio of the number of nitrogen atoms-to-the valence change in the sodium peroxide upon reaction with the azide multiplied by the number of mols of sodium peroxide was 2.7. That is, in equation $n/m=y$ the value of $y$ was 2.7.

In like manner, a gas generating unit is prepared using 1.67 parts of sodium azide and 1 part of sodium peroxide to provide a composition in which the value of $y$ in the equation $n/m=y$ is 3. A composition prepared from 1.3 parts of sodium azide and 1 part of sodium peroxide has a $y$ value of 2.34. A composition prepared from 2 parts of sodium azide and 1 part of sodium peroxide has a $y$ value of 3.6

EXAMPLE II

Following the procedure of Example I, a gas generator grain is prepared from 12.8 parts of barium azide, $Ba(N_3)_2$, and 1 part of potassium perchlorate, $KClO_4$, to produce a composition in which the ratio $n/m=y$ has a value of 3.6.

EXAMPLE III

A gas generator grain prepared as in Example I from 19 parts of potassium azide, $KN_3$, and 8.5 parts of sodium nitrate, $NaNO_3$, together with 0.1 part of ferric oxide powder having a particle size of from 10 to about 100 microns, has an $n/m=y$ value of 2.34.

Other metal azide-oxidizing compound gas generator grains are prepared in like manner having compositions as in the following table in which the amounts are given in parts by weight.

*Table*

| No. | Metal Azide | Parts | Oxidizing Compound | Parts | Catalyst | Parts | $n/m=y$ |
|---|---|---|---|---|---|---|---|
| 1 | Lithium azide | 10 | Barium peroxide | 21 | | | 2.5 |
| 2 | Rubidium azide | 12 | Potassium peroxide | 5.5 | Alumina | 0.2 | 2.8 |
| 3 | Cesium azide | 4 | Barium peroxide | 17 | Ferric oxide | 0.1 | 3.4 |
| 4 | Strontium azide | 86 | Calcium perchlorate | 15 | | | 3.0 |
| 5 | Sodium azide | 63 | Cobalt perchlorate | 16 | | | 2.9 |
| 6 | Lithium azide | 2 | Magnesium nitrate | 1 | | | 3.1 |
| 7 | Sodium azide | 38 | Manganese nitrate | 15 | | | 3.5 |
| 8 | Potassium azide | 26 | Ferric nitrate | 9 | Manganese | 1.0 | 2.9 |
| 9 | Calcium azide | 16 | Silver nitrate | 19 | | | 2.3 |
| 10 | Barium azide | 38 | Cadmium nitrate | 13 | | | 3.6 |
| 11 | Strontium azide | 77 | Aluminum nitrate | 27 | Zirconium oxide | 1.0 | 2.7 |
| | Barium azide | 20 | Lead nitrate | 11 | | | |

To test the operation of the gas generator units, the unit prepared as in Example I and shown in Fig. 1 was mounted on an anchored stand and fired by passing an electric current through the heating element 27. The flash powder, upon being ignited, served to ignite the gas generator grain which then burned on the surface, liberating nitrogen gas. The nitrogen gas upon building up sufficient pressure ruptured frangible disk 12 and was directed against the pickup of a pressure measuring device which contained a strain gage adapted to indicate the pressure on an oscillograph to which it is connected. The pressure from the combustion gas of the composition of Example I was found in this case to be 1000 pounds per square inch over a period of 10 seconds. The whole gas generator grain was consumed with an even evolution of gas. That is, there was no fluctuation in gas pressure, indicating that the grain burned evenly on the surface. Gas generator grains prepared as in Examples II and III and those having the compositions shown in the table are tested in similar manner and give good results.

In the operation of a rocket, a gas generator grain prepared as in Example I, is mounted on the inside of a fuel tank of a rocket, aircraft or missile in a position such that it is not in contact with the liquid fuel. The method of operation of a rocket or missile employing the gas generator unit may be more readily described with reference to Fig. 2. In this figure, missile 1 has a warhead 2, a central section containing an outer annular propellant tank 3 and an inner annular propellant tank 4, and a rocket motor 5. Fuel injection lines 7 lead from the annular propellant tanks 3 and 4 to the rocket combustion chambers 6. On the inside of the annular propellant tanks 8 and 9 is located chamber 8 which is cylindrical in shape and is longitudinally disposed along the axis of the missile. The gas generator grain unit 9, of Fig. 1, is placed on the bottom of chamber 8 with the cover containing frangible disk 12 in a forward position with respect to the missile. The heating element for igniting the contents of the gas generator unit is connected to electrical inlet 11. The internal chamber 8 connects with forward chamber 10 with contacts the forward ends of the annular propellant tanks 3 and 4. The propellant tanks have frangible disk inserts 13 in the forward ends connecting the chamber 10 with the propellant tanks. The frangible disks 13 are constructed to rupture at a preselected pressure. To operate the missile, a current is passed through the heating element through the inlet 11. This causes the composition in the gas generator to ignite. The nitrogen gas evolved upon the reaction or combustion of the azide-oxidizer composition ruptures the frangible disk 12 and fills chambers 8 and 10. When the pressure in these chambers is built up to a predetermined value, frangible disks 13 are ruptured and the gas passes into the propellant tanks 3 and 4. The pressure exerted by the gas causes the propellants to flow through the injection lines 7 into the combustion chamber 6 of the rocket motor 5. When the rocket motor propellants are hypergolic as, for example, nitric acid and turpentine, the mixture will ignite spontaneously upon contact in the combustion chamber, producing the necessary thrust gases for propelling the rocket or missile. Efficient motor operation is obtained in this manner with no deleterious effects of the nitrogen gas, which is evolved from the gas generator unit, on the propulsion fuels used.

Gas generator grains having the compositions shown in the table give equally good results when employed to pressurize rocket engine propellant containers as described above.

As stated hereinabove, the use of the compositions of this invention in gas generator grains produces only an inert nitrogen gas which does not affect the fuel. Also, there are no corrosive products from the combustion of the gas generator grain so that there is no deleterious effects upon either the container or the rocket motor. Therefore, an embodiment of this invention is a method for feeding or expelling liquid propellants to the motor of a missile or rocket comprising burning or reacting an azide-oxidizer composition of the type described hereinabove to produce nitrogen gas, pressurizing the propellant container of the missile or rocket with the nitrogen gas and thus causing the propellant to be fed to the motor of the missile or rocket.

Although the invention has been described and illustrated in detail, it is to be clearly understood that the same is by way of illustration and example only and is not to be taken by way of limitation, the spirit and scope of the invention being limited only by the terms of the appended claims.

I claim:

1. A composition consisting essentially of (1) an azide having the general formula $M(N_3)_x$ wherein M is selected from the class consisting of a hydrazino radical, an ammonium radical, an alkali metal and an alkaline earth metal, N is nitrogen, and $x$ represents the valency of M, and (2) at least one oxidizing compound selected from the class consisting of metal peroxides, inorganic perchlorates and metal nitrates; said azides and said oxidizing compounds being present in amounts expressed by the equation $n/m=y$, wherein $n$ represents the number of azide nitrogen atoms, $m$ represents the number of equivalents of oxidizing compounds, and $y$ has a numerical value of from about 2.3 to about 3.6.

2. A composition consisting essentially of (1) an azide having the general formula $M(N_3)_x$ wherein M is an alkali metal, N is nitrogen, and $x$ represents the valence of M, and (2) at least one oxidizing compound selected from the class consisting of metal peroxides, inorganic perchlorates and metal nitrates; said azides and said oxidizing compounds being present in amounts expressed by the equation $n/m=y$, wherein $n$ represents the number of azide nitrogen atoms, $m$ represents the number of equivalents of oxidizing compounds, and $y$ has a numerical value of from about 2.3 to about 3.6.

3. A composition consisting essentially of (1) an azide having the general formula $M(N_3)$ wherein M is an alkali metal and N is nitrogen, and (2) a metal peroxide; said alkali metal azide and said peroxide being present in amounts expressed by the equation $n/m=y$ wherein $n$ is the number of equivalents of metal peroxide, and $y$ has a numerical value of from about 2.3 to about 3.6.

4. The composition of claim 3 wherein the metal peroxide is an alkali metal peroxide.

5. The composition of claim 3 wherein the alkali metal azide is sodium azide and the metal peroxide is an alkali metal peroxide.

6. The composition of claim 3 wherein the alkali metal azide is sodium azide and the metal peroxide is sodium peroxide.

7. The composition of claim 3 wherein the alkali metal azide is sodium azide, the metal peroxide is sodium peroxide and the value of $y$ is substantially 2.7.

8. A composition consisting essentially of sodium azide and sodium peroxide in amounts such that the ratio of the number of azide nitrogen atoms-to-equivalents of sodium peroxide is substantially 2.7, and from about 0.1 to about 3 weight percent of a compatible burning catalyst selected from the class consisting of powdered carbon, phosphorus, sulfur and metal and metalloid powders and their oxides of copper, magnesium, boron, aluminum, zirconium, vanadium, antimony, manganese, iron, cobalt, nickel, ferric oxide and silica.

References Cited in the file of this patent

UNITED STATES PATENTS

| | | |
|---|---|---|
| 2,001,212 | Olsen et al. | May 14, 1935 |
| 2,004,505 | McNutt | June 11, 1935 |
| 2,410,801 | Audrieth | Nov. 12, 1946 |

FOREIGN PATENTS

| | | |
|---|---|---|
| 310,049 | Germany | Apr. 14, 1921 |
| 362,048 | Great Britain | Dec. 3, 1931 |

OTHER REFERENCES

Military Explosives, TM-1910/TO11A-1-34, Depts. of the Army and Air Force, April 1955, pages 95-96. (Copy in Sci. Lib.)